(12) United States Patent
Weeramantry et al.

(10) Patent No.: US 9,447,858 B2
(45) Date of Patent: Sep. 20, 2016

(54) HYDRO-MECHANICAL CONTINUOUSLY VARIABLE TRANSMISSION FOR PRODUCING HIGH TORQUE OUTPUT

(71) Applicant: CNH Industrial America LLC, New Holland, PA (US)

(72) Inventors: Cecil Asoka Weeramantry, Darien, IL (US); Haibo Guo, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 211 days.

(21) Appl. No.: 14/349,059

(22) PCT Filed: Nov. 12, 2012

(86) PCT No.: PCT/US2012/064603
§ 371 (c)(1),
(2) Date: Apr. 1, 2014

(87) PCT Pub. No.: WO2013/074430
PCT Pub. Date: May 23, 2013

(65) Prior Publication Data
US 2014/0248986 A1  Sep. 4, 2014

Related U.S. Application Data

(60) Provisional application No. 61/559,668, filed on Nov. 14, 2011.

(51) Int. Cl.
| F16H 47/10 | (2006.01) |
|---|---|
| F16H 47/04 | (2006.01) |
| B60W 10/02 | (2006.01) |
| B60W 10/103 | (2012.01) |
| B60W 30/19 | (2012.01) |

(Continued)

(52) U.S. Cl.
CPC .............. *F16H 47/10* (2013.01); *B60W 10/02* (2013.01); *B60W 10/103* (2013.01); *B60W 30/19* (2013.01); *F16H 47/04* (2013.01); *F16H 61/462* (2013.01); *F16H 2037/0886* (2013.01); *F16H 2037/106* (2013.01); *F16H 2200/2005* (2013.01); *F16H 2200/2007* (2013.01); *F16H 2200/2023* (2013.01)

(58) Field of Classification Search
CPC ....................................................... F16H 47/10
See application file for complete search history.

(56) References Cited

U.S. PATENT DOCUMENTS

| 3,442,153 | A | 5/1969 | Ross |
|---|---|---|---|
| 3,744,344 | A * | 7/1973 | Olsen ..................... F16H 47/04 475/79 |

(Continued)

*Primary Examiner* — Derek D Knight
(74) *Attorney, Agent, or Firm* — Rebecca L. Henkel

(57) ABSTRACT

A hydro-mechanical continuously variable transmission for producing high torque output is provided. One transmission includes an engine drive shaft driven by an engine and a planetary gear unit driven by power from the engine and to provide power to drive a transmission output shaft. The transmission also includes a hydrostatic drive unit driven by power from the engine and to drive a primary hydrostatic drive shaft. The transmission includes an engine clutch to be driven by the engine and to drive an input sun gear of the planetary gear unit while engaged. The transmission includes a secondary hydrostatic drive shaft driven by the primary hydrostatic drive shaft and to drive a ring gear of the planetary gear unit. The transmission includes a hydrostatic output clutch driven by the secondary hydrostatic drive shaft and to provide power to drive an output sun gear of the planetary gear unit while engaged.

6 Claims, 3 Drawing Sheets

(51) Int. Cl.
*F16H 61/462* (2010.01)
*F16H 37/10* (2006.01)
*F16H 37/08* (2006.01)

(56) References Cited

U.S. PATENT DOCUMENTS

| | | | |
|---|---|---|---|
| 3,861,240 A | 1/1975 | Nolan et al. | |
| 3,903,756 A | 9/1975 | Hamma | |
| 3,969,957 A | 7/1976 | DeLalio | |
| 4,291,592 A | 9/1981 | Meyerle et al. | |
| 4,754,664 A * | 7/1988 | Dick | F16H 47/04 475/81 |
| 5,406,793 A | 4/1995 | Maruyama et al. | |
| 5,540,051 A | 7/1996 | Maruyama et al. | |
| 5,667,452 A | 9/1997 | Coutant | |
| 5,684,694 A | 11/1997 | Ishino et al. | |
| 5,888,162 A | 3/1999 | Moeller et al. | |
| 6,007,444 A | 12/1999 | Kinokami | |
| 6,080,074 A * | 6/2000 | Ulbrich | F16H 47/04 475/72 |
| 6,106,427 A | 8/2000 | Nicholas et al. | |
| 6,435,999 B1 | 8/2002 | Nanri et al. | |
| 6,440,026 B1 * | 8/2002 | Johnson | F16H 47/04 475/81 |
| 6,450,912 B2 * | 9/2002 | Todeschini | F16H 47/04 475/72 |
| 6,565,471 B2 * | 5/2003 | Weeramantry | F16H 47/04 475/218 |
| 6,595,885 B1 | 7/2003 | Lutgen | |
| 6,616,559 B1 | 9/2003 | Hori et al. | |
| 6,852,056 B2 | 2/2005 | Weeramantry | |
| 7,063,638 B2 | 6/2006 | Weeramantry | |
| 8,808,131 B2 * | 8/2014 | Seipold | F16H 47/04 475/219 |
| 9,097,342 B2 * | 8/2015 | Dix | F16H 61/472 |
| 2007/0137338 A1 * | 6/2007 | Nishi | F16H 61/423 74/335 |
| 2011/0021302 A1 * | 1/2011 | Panizzolo | F16H 47/04 475/207 |
| 2014/0188354 A1 * | 7/2014 | Guo | B60W 10/04 701/53 |
| 2015/0307077 A1 * | 10/2015 | Xing | B60W 10/06 701/50 |

* cited by examiner

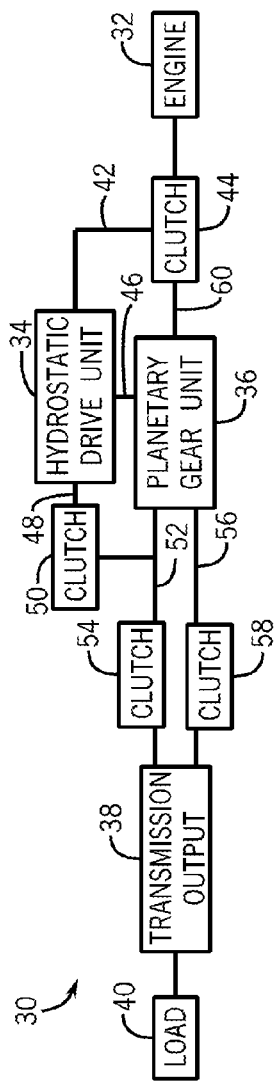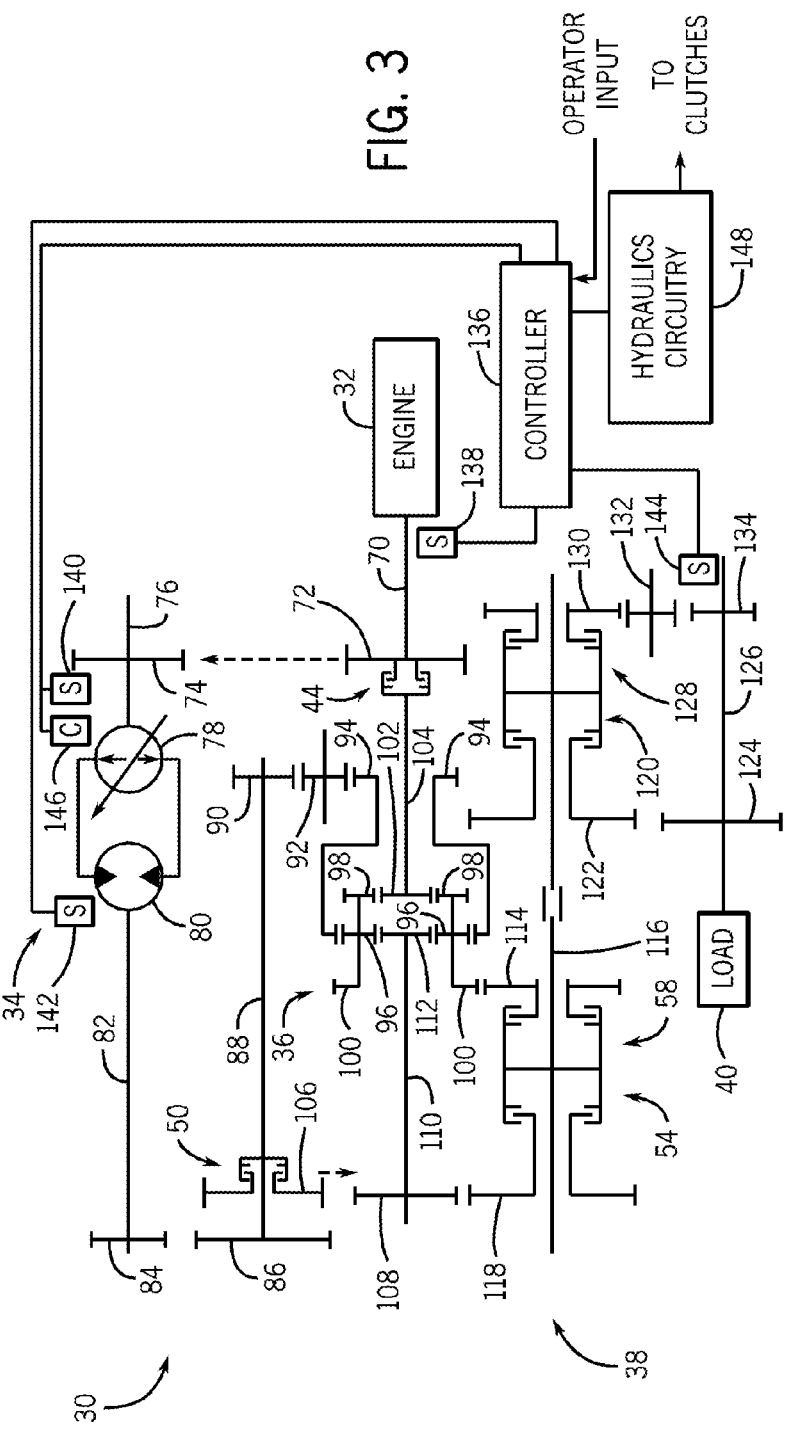

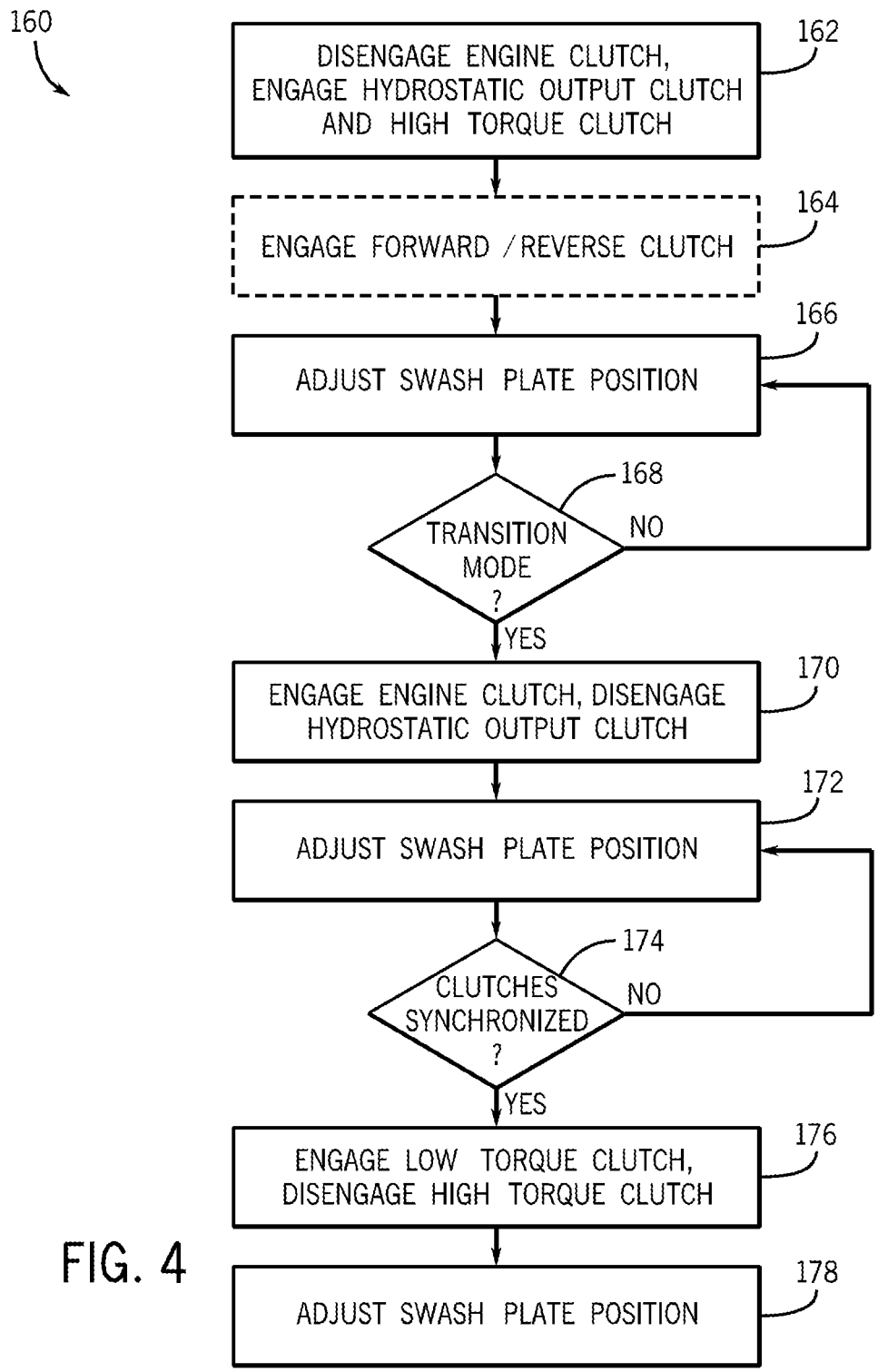

HYDRO-MECHANICAL CONTINUOUSLY VARIABLE TRANSMISSION FOR PRODUCING HIGH TORQUE OUTPUT

CROSS REFERENCE TO RELATED APPLICATION

This application claims priority from and the benefit of U.S. Provisional Patent Application Ser. No. 61/559,668 entitled "HYDRO-MECHANICAL CONTINUOUSLY VARIABLE TRANSMISSION FOR PRODUCING HIGH TORQUE OUTPUT", filed Nov. 14, 2011, which is hereby incorporated by reference in its entirety.

BACKGROUND

The invention relates generally to transmissions and, more particularly, to a hydro-mechanical continuously variable transmission for producing high torque output.

Transmissions are used in agricultural and construction equipment to transmit power from power sources, such as internal combustion engines to equipment for accomplishing a desired task. For example, transmissions are used to properly transmit power to the wheels of a vehicle, or to a vehicle implement. A continuously variable transmission (CVT) is a transmission that can change through an infinite number of effective gear ratios between a minimum and maximum range. In contrast, non-CVT transmissions offer a fixed number of gear ratios. Specifically, hydrostatic CVTs may use a variable displacement pump and a hydraulic motor and transmit power using hydraulic fluid. A swash plate may be used within the variable displacement pump to vary the output of the hydrostatic CVT by adjusting the fluid flowing into the hydraulic motor. Thus, the swash plate may enable the hydrostatic CVT to be continuously variable. Some hydrostatic CVTs may be combined with gear assemblies, drive shafts, and clutches to create a hydro-mechanical CVT. It may be appreciated that in certain applications, such as in construction equipment, a high torque output may be utilized by implements of the construction equipment. Further, a high torque output may be beneficial for low speed movement of vehicles, such as construction vehicles or agricultural vehicles. However, hydro-mechanical CVTs may provide start up torque inefficiently for such applications.

BRIEF DESCRIPTION

In one embodiment, a transmission for a vehicle includes an engine drive shaft configured to be driven by an engine and a planetary gear unit configured to be driven by power from the engine and to provide power to drive a transmission output shaft. The transmission also includes a hydrostatic drive unit configured to be driven by power from the engine and to drive a primary hydrostatic drive shaft. The transmission includes an engine clutch configured to be driven by the engine and to drive an input sun gear of the planetary gear unit while engaged. The transmission also includes a secondary hydrostatic drive shaft configured to be driven by the primary hydrostatic drive shaft and to drive a ring gear of the planetary gear unit. The transmission includes a hydrostatic output clutch configured to be driven by the secondary hydrostatic drive shaft and to provide power to drive an output sun gear of the planetary gear unit while engaged.

In another embodiment, a transmission for a vehicle includes an engine drive shaft configured to be driven by an engine and a planetary gear unit configured to be driven by power from the engine and to provide power to drive a transmission output shaft. The transmission also includes a hydrostatic drive unit configured to be driven continuously by power from the engine and to drive a primary hydrostatic drive shaft. The transmission includes an engine clutch driven by the engine and configured to drive an input sun gear of the planetary gear unit while engaged. The transmission also includes a secondary hydrostatic drive shaft configured to be driven by the primary hydrostatic drive shaft and to drive a ring gear of the planetary gear unit. The transmission includes a hydrostatic output clutch configured to be driven by the secondary hydrostatic drive shaft and to provide power to drive an output sun gear of the planetary gear unit while engaged. The transmission also includes a high torque clutch configured to be driven by a planet carrier of the planetary gear unit and to drive the transmission output shaft. The transmission includes a low torque clutch configured to be driven by the output sun gear of the planetary gear unit and to drive the transmission output shaft. The transmission also includes a controller configured to cause the hydrostatic output clutch and the high torque clutch to be engaged and to cause the engine clutch and the low torque clutch to be disengaged to cause the planetary gear unit to operate in a hydrostatic differential mode while the vehicle is not moving, or while the vehicle is moving at low speeds.

In another embodiment, a planetary gear unit for a vehicle transmission includes an input sun gear configured to be selectively driven by power from an engine and a ring gear configured to be driven by power from a hydrostatic drive unit. The planetary gear unit also includes an output sun gear configured to be driven by power from the hydrostatic drive unit while a hydrostatic output clutch is engaged and to drive an output sun gear shaft coupled to the output sun gear for providing power to a transmission output shaft while the hydrostatic output clutch is not engaged. The planetary gear unit includes a planet carrier configured to provide power to drive the transmission output shaft while the hydrostatic output clutch is engaged.

DRAWINGS

These and other features, aspects, and advantages of the present invention will become better understood when the following detailed description is read with reference to the accompanying drawings in which like characters represent like parts throughout the drawings, wherein:

FIG. 2 is a block diagram of an embodiment of a hydro-mechanical CVT system for producing a high torque output in accordance with the disclosure;

FIG. 3 is a schematic diagram of an embodiment of a hydro-mechanical CVT system generally conforming to the embodiment of FIG. 2; and FIG. 4 is a flow chart of an embodiment of a method for transitioning between operating modes of a hydro-mechanical CVT system.

DETAILED DESCRIPTION

Figure 1:
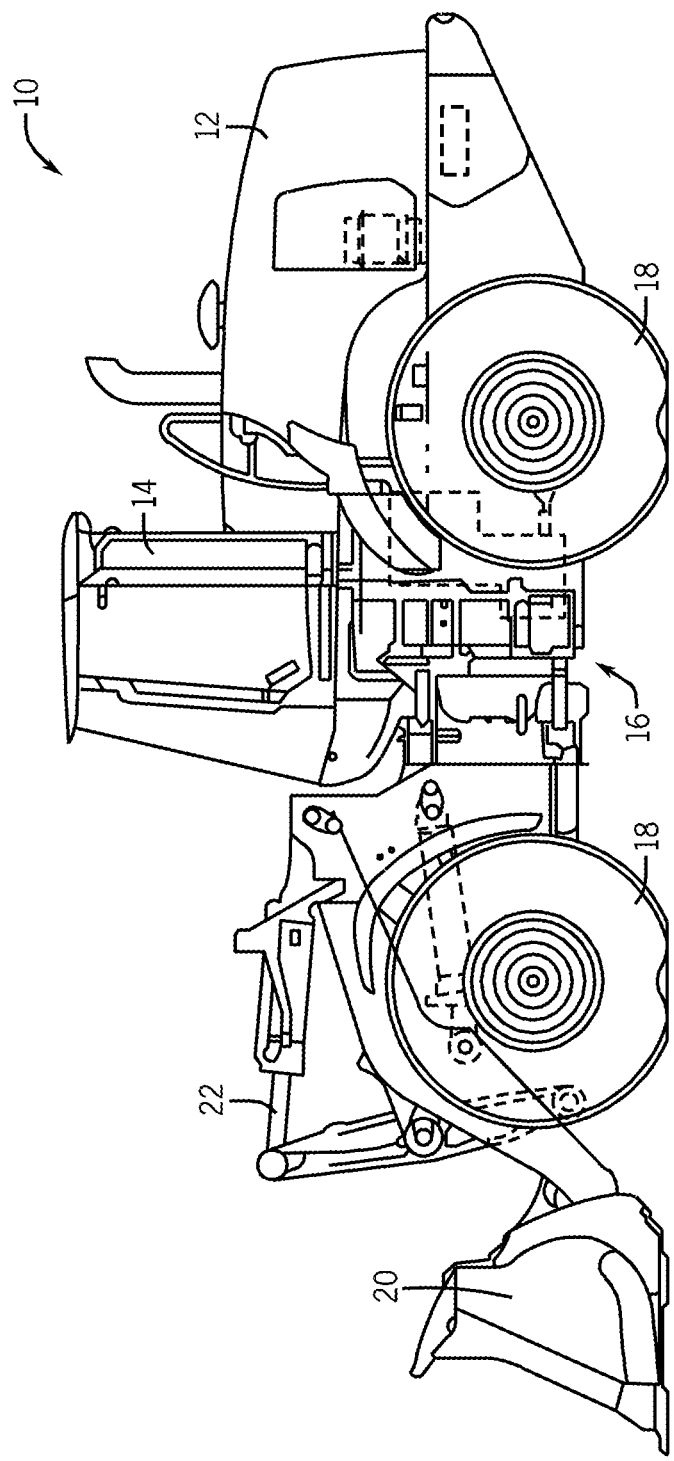
FIG. 1 is a perspective view of an embodiment of a construction vehicle that may employ a high torque output hydro-mechanical CVT system in accordance with the present disclosure.

FIG. 1 illustrates an exemplary construction vehicle 10 that may employ a high torque output hydro-mechanical CVT system. In certain embodiments, the construction vehicle 10 may be any type of wheel loader, grader, backhoe, forklift, tractor, off-road vehicle, work vehicle, or any other suitable vehicle that utilizes a transmission. The vehicle 10 illustrated has a body 12 that will typically house an engine, transmission (e.g., hydro-mechanical CVT), and power train (not separately shown). Further, the construction vehicle 10 has a cabin 14 where an operator may sit or stand to operate the vehicle 10. The vehicle 10 has two front wheels 16 and two rear wheels 18 (only one is shown) that rotate to move the vehicle 10. As illustrated, the construction vehicle 10 includes a bucket 20 that is moved using an actuating cylinder 22. As may be appreciated, the construction vehicle 10 may power the bucket 20 and/or wheels 16 and 18 using a high torque transmission. For example, the construction vehicle 10 may use a hydro-mechanical CVT system to provide a high torque for powering the bucket 20 and/or for rotating the wheels 16 and 18.

FIG. 2 is a block diagram of an embodiment of a hydro-mechanical CVT system 30 for producing a high torque output. The system 30 includes an engine 32 (e.g., an internal combustion engine) that provides power to drive a hydrostatic drive unit 34 and a planetary gear unit 36. Output from the planetary gear unit 36 is used to produce a transmission output 38. The transmission output 38 drives a load 40, such as the wheels of the vehicle 10.

During operation, the engine 32 drives the hydrostatic drive unit 34 using gears and shafts 42. The gears and shafts 42 also drive an input to an engine clutch 44. The output of the engine clutch 44 may drive the planetary gear unit 36, as will be described in more detail below. The hydrostatic drive unit 34 uses gears and shafts 46 to drive a ring gear of the planetary gear unit 36. Further, the hydrostatic drive unit 34 uses gears and shafts 48 to drive an input of a hydrostatic output clutch 50. While engaged, an output of the hydrostatic output clutch 50 drives gears and shafts 52, which includes an output sun gear of the planetary gear unit 36. Although the gears and shafts 52 drive an input of a low torque clutch 54, the low torque clutch 54 is not engaged while the hydrostatic clutch 50 is engaged.

As described, the planetary gear unit 36 is driven by both the ring gear and the output sun gear. Because of a high gear ratio between the output sun gear and the ring gear, a high output torque is produced by the planetary gear unit 36. The power produced by the planetary gear unit 36 is used to drive gears and shafts 56, which includes a planet carrier. Further, the gears and shafts 56 drive an input to a high torque clutch 58. While the high torque clutch 58 is engaged, the high torque clutch 58 drives the transmission output 38 where the high output torque is provided to the load 40. In such a configuration, the hydrostatic output clutch 50 and the high torque clutch 58 are engaged, while the engine clutch 44 and the low torque clutch 54 are disengaged. As such, the hydrostatic drive unit 34 drives the planetary gear unit 36 and the hydro-mechanical CVT system 30 is operating in a purely hydrostatic mode. Further, the planetary gear unit 36 is operating in a hydrostatic differential mode when driven by the ring gear and the output sun gear. As may be appreciated, the speed of the transmission output 38 may be determined by the position of a swash plate in a pump of the hydrostatic drive unit 34. Therefore, when the swash plate position is changed, the speed of the transmission output 38 changes.

To transition the hydro-mechanical CVT system 30 to a hydro-mechanical mode, the engine clutch 44 is engaged and the hydrostatic clutch 50 is disengaged. While the engine clutch 44 is engaged, the engine clutch 44 drives gears and shafts 60, which include an input sun gear of the planetary gear unit 36. The hydrostatic drive unit 34 is driven by the gears and shafts 42 and continues to drive the ring gear of the planetary gear unit 36. Thus, in the hydro-mechanical mode of the hydro-mechanical CVT system 30, the ring gear and the input sun gear of the planetary gear unit 36 are driven. In such a configuration, the planetary gear unit 36 is operating in a combined differential mode. During a transition mode, the planetary gear unit 36 continues to drive the planet carrier which drives the high torque clutch 58 for driving the transmission output 38 until the low torque clutch 54 is synchronized with the high torque clutch 58. As may be appreciated, the low torque and high torque clutches 54 and 58 may be synchronized by adjusting the position of the swash plate of the hydrostatic drive unit 34. After the low torque clutch 54 is synchronized with the high torque clutch 58, the high torque clutch 58 is disengaged and the low torque clutch 54 is engaged and the system 30 operates in the hydro-mechanical mode. The output sun gear of the planetary gear unit 36 drives the low torque clutch 54 for driving the transmission output 38 with lower torque than with the high torque clutch 58.

As may be appreciated, the hydro-mechanical CVT system 30 may operate in the hydrostatic mode during vehicle startup and at low speeds in order to provide a higher torque than at other times. Specifically, low speeds may be considered approximately 0 to 3, 0 to 5, or 0 to 8 kph in a forward or reverse direction. For example, the system 30 may operate in the hydrostatic mode while the vehicle is moving at less than approximately 3 kph in a forward or reverse direction. When the vehicle speed approaches an upper threshold of a range of low speeds, the system 30 may enter a transition speed range. In the transition speed range, the system 30 may transition from the hydrostatic mode to the hydro-mechanical mode. Specifically, transition speeds may be considered approximately 2 to 6, 4 to 8, or 5 to 11 kph in a forward or reverse direction. For example, the system 30 may be within the transition speed range while the vehicle is moving between approximately 2 to 4 kph in a forward or reverse direction. After the transition to the hydro-mechanical mode, the system 30 remains in the hydro-mechanical mode while the vehicle speed remains at high speeds. Specifically, high speeds may be considered speeds greater than approximately 3, 5, 8, 10, or 11 kph in a forward or reverse direction, depending on the engine speed.

FIG. 3 is a schematic diagram of an embodiment of a hydro-mechanical CVT system 30 generally conforming to the embodiment of FIG. 2. As illustrated, an engine drive shaft 70 couples the engine 32 to an engine shaft output gear 72 and the input of the engine clutch 44. Therefore, as the engine drive shaft 70 is driven by the engine 32 to rotate, the engine shaft output gear 72 and the engine clutch 44 also rotate. The engine shaft output gear 72 is coupled to a hydrostatic input shaft gear 74 and rotates to drive the hydrostatic input shaft gear 74. A hydrostatic input drive shaft 76 couples the hydrostatic input shaft gear 74 to the hydrostatic drive unit 34 and provides power to the hydrostatic drive unit 34 when driven.

As illustrated, the hydrostatic drive unit 34 includes a hydraulic pump 78 and a hydraulic motor 80 that collectively drive a primary hydrostatic drive shaft 82. Specifically, the hydraulic pump 78 is driven by the hydrostatic input drive shaft 76. The hydraulic pump 78 pumps hydraulic fluid to the hydraulic motor 80 which converts the fluid pressure to rotational energy to rotate the drive shaft 82. In certain embodiments, the hydraulic pump 78 may be a variable displacement pump for varying the output of hydraulic fluid to the hydraulic motor 80. In such embodiments, the hydraulic pump 78 may include a swash plate for varying the amount of hydraulic fluid pumped. Further, in some embodiments, the hydraulic motor 80 may be a variable motor for varying the output rotation provided to the primary hydrostatic drive shaft 82.

A primary hydrostatic shaft output gear 84 is coupled to the primary hydrostatic drive shaft 82 and configured to be driven to rotate while the primary hydrostatic drive shaft 82 is driven by the hydrostatic drive unit 34. The primary hydrostatic shaft output gear 84 is coupled to a secondary hydrostatic shaft input gear 86 and rotates to drive the secondary hydrostatic shaft input gear 86. Further, a secondary hydrostatic drive shaft 88 couples the secondary hydrostatic shaft input gear 86 to the input of the hydrostatic output clutch 50 and to a secondary hydrostatic shaft output gear 90. As illustrated, the secondary hydrostatic shaft output gear 90 is coupled to a drop gear 92 and is configured to drive the drop gear 92 to rotate. Further, the drop gear 92 is coupled to a ring gear 94 of the planetary gear unit 36 and is configured to rotate the ring gear 94. As part of the planetary gear unit 36, a first set of planet gears 96 are coupled to the ring gear 94 and rotate within the ring gear 94. In addition, a second set of planet gears 98 are coupled to the first set of planet gears 96 via a shaft and rotate while the first set of planet gears 96 rotate. Further, the planetary gear unit 36 includes a planet carrier 100 coupled to the first set of planet gears 9 via a shaft and the planet carrier 100 is also rotated while the first set of planet gears 96 rotates. The second set of planet gears 98 are coupled to an input sun gear 102. As illustrated, the input sun gear 102 is coupled to an input sun drive shaft 104. The input sun drive shaft 104 is driven by the engine 32 while the engine clutch 44 is engaged to the input sun drive shaft 104. Thus, while the input sun drive shaft 104 is driven, the input sun drive shaft 104 drives the second set of planet gears 98 to rotate.

Returning to the hydrostatic output clutch 50, while the clutch 50 is engaged, the output of the hydrostatic output clutch 50 is coupled to a hydrostatic output clutch gear 106 and drives the gear 106 to rotate while the secondary hydrostatic drive shaft 88 rotates. As illustrated, the hydrostatic output clutch gear 106 is coupled to a gear 108 for driving an output sun drive shaft 110 while the hydrostatic output clutch 50 is engaged. Further, an output sun gear 112 is coupled to the output sun drive shaft 110 and, while the output sun gear 112 is driven by the output sun drive shaft 110, the output sun gear 112 drives the first set of planet gears 96. The planet carrier 100 is coupled to a high torque driving gear 114. The high torque driving gear 114 is the input to the high torque clutch 58. While engaged, the high torque clutch 58 clutches a transmission output shaft 116 for outputting power from the hydro-mechanical CVT system 30.

The gear 108 coupled to the output sun drive shaft 110 may transfer driving power from the output sun gear 112 of the planetary gear unit 36. As such, the gear 108 is coupled to a low torque driving gear 118. The low torque driving gear 118 is the input to the low torque clutch 54. While engaged, the low torque clutch 54 clutches the transmission output shaft 116 for outputting power from the hydro-mechanical CVT system 30. Power from the transmission output shaft 116 may be provided to the load 40 in either a forward or reverse direction. For example, power may be provided to the load 40 in a forward direction by engaging a forward clutch 120. While the forward clutch 120 is engaged, a forward clutch gear 122 is clutched to the transmission output shaft 116. Further, the forward clutch gear 122 is coupled to a forward drive gear 124 which rotates a load drive shaft 126. As another example, power may be provided to the load 40 in a reverse direction by engaging a reverse clutch 128. While the reverse clutch 128 is engaged, a reverse clutch gear 130 is clutched to the transmission output shaft 116. Further, the reverse clutch gear 130 is coupled to a reversing gear 132 which is coupled to a reverse drive gear 134 for rotating the load drive shaft 126.

As illustrated, the hydro-mechanical CVT system 30 also includes a control system for controlling the operation of the swash plate and the clutches. Specifically, the system 30 includes a controller 136 that receives input from a variety of sensors and controls the operation of the system 30. For example, a sensor 138 measures a speed of the engine 32 and provides an indication of the engine speed to the controller 136. Further, a sensor 140 measures a position of the swash plate and provides an indication of the swash plate position to the controller 136. In addition, a sensor 142 measures a speed of the hydraulic motor 80 and provides an indication of the hydraulic motor speed to the controller 136. A sensor 144 measures a speed of the load drive shaft 126 and provides an indication of the load drive shaft speed to the controller 136. The controller 136 uses indications from the various sensors 138, 140, 142, and 144 to determine a desired position of the swash plate, among other things. The controller 136 uses the determined swash plate position to provide a swash plate control signal to the swash plate. As illustrated, the controller 136 may also receive operator input for controlling operation of the vehicle 10. For example, the vehicle operator may select to move the vehicle 10 in either forward or reverse, control the throttle of the vehicle 10, and control the movement of an implement, among other things. Further, the controller 136 controls a hydraulics circuitry 148 that hydraulically controls whether the clutches 44, 50, 54, 58, 120, and 128 are engaged.

In some embodiments, the hydro-mechanical CVT system 30 may be a two range input coupled CVT unit, as illustrated. In other embodiments, the hydro-mechanical CVT system 30 may be a four range input coupled CVT unit or some other range input coupled CVT unit. It will be appreciated, that the hydro-mechanical CVT system 30 described herein may provide output power more efficiently than other transmission systems used in vehicles 10, such as constructions vehicles. Furthermore, the hydro-mechanical CVT system 30 provides a high torque output that may be greater than the torque provided by other transmission systems.

As previously described, the hydro-mechanical CVT system 30 may operate in a hydrostatic mode, a transition mode, or a hydro-mechanical mode. These modes will be described using the schematic diagram of FIG. 3 in conjunction with the flow chart of FIG. 4. Specifically, FIG. 4 illustrates a flow chart of a method 160 for transitioning between operating modes of the hydro-mechanical CVT system 30. In one embodiment, the hydro-mechanical CVT system 30 begins operation in the hydrostatic mode for operating the vehicle 10 with a high torque output at low vehicle speeds. When the vehicle 10 approaches an upper threshold of the low vehicle speeds, the system 30 switches to the transition mode until the system 30 has moved to the hydro-mechanical mode. In the hydro-mechanical mode, the vehicle 10 may be operated at high vehicle speeds. As may be appreciated, the transition between the modes may be seamlessly accomplished.

At block 162, the controller 136 instructs the hydraulics circuitry 148 to cause the hydrostatic output clutch 50 and the high torque clutch 58 to be engaged. Further, the controller 136 instructs the hydraulics circuitry 148 to cause the engine clutch 44 and the low torque clutch 54 to be disengaged. As may be appreciated, at block 164, the controller 136 may instruct the hydraulics circuitry 148 to cause the forward clutch 120 or the reverse clutch 128 to be engaged based on a selection by the vehicle operator to move the vehicle 10 in the forward or reverse direction.

During operation with such a configuration (the hydrostatic mode), the engine 32 rotates and causes the engine shaft output gear 72 to drive the hydrostatic input shaft gear 74 to rotate. This causes the hydrostatic drive unit 34 to be powered and to drive the primary hydrostatic drive shaft 82. The rotation of the primary hydrostatic drive shaft 82 causes the secondary hydrostatic drive shaft 88 to rotate due to the coupling of the gears 84 and 86. The secondary hydrostatic drive shaft 88 rotation causes the ring gear 94 of the planetary gear unit 36 to rotate via gears 90 and 92. Further, with the hydrostatic output clutch 50 engaged, the gears 106 and 108 cause the output sun gear shaft 110 to rotate, thereby rotating the output sun gear 112 of the planetary gear unit 36. Thus, the planetary gear unit 36 functions in the hydrostatic differential mode and uses a summation of the driving forces supplied to the ring gear 94 and the output sun gear 112.

As may be appreciated, multiple gear reductions may occur prior to driving forces being supplied to the planetary gear unit 36. For example, a gear reduction may occur between gears 90 and 92, 92 and 94, 84 and 86, 106 and 108, or any combination thereof. In addition, further gear reductions may occur within the planetary gear unit 36. For example, a gear reduction may occur between gears 112 and 96, 94 and 96, or any combination thereof. The driving forces applied by the ring gear 94 and the output sun gear 112 to the planetary gear unit 36 are combined and output by the planet carrier 110 to drive the high torque clutch 58 using gear 114. Again, another gear reduction may occur between gears 100 and 114. The high torque clutch 58 drives the transmission output shaft 116. If the forward clutch 120 is engaged, the load driving shaft 126 drives the load 40 in the forward direction. Conversely, if the reverse clutch 128 is engaged, the load driving shaft 126 drives the load 40 in the reverse direction. As may be appreciated, the high torque provided to the transmission output shaft 116 may be due to the arrangement of the combined driving forces applied to the planetary gear unit 36, the gear reductions, a high gear ration between the output sun gear 112 and the ring gear 94, or some combination thereof.

At block 166, the controller 136 causes the swash plate of the hydraulic pump 146 to be adjusted. This may be due to a request for a speed change by the vehicle operator, or movement of an implement of the vehicle 10. For example, the vehicle operator may increase the vehicle 10 throttle, which may cause the swash plate to move to a new position to cause the vehicle 10 to change its speed. As will be appreciated, the controller 136 may keep the vehicle 10 in the hydrostatic mode as long as the vehicle 10 is operating at low speeds (e.g., less than approximately 3 kph). As the vehicle 10 approaches the upper threshold of the low speeds, the controller 136 determines whether to change the hydromechanical CVT system 30 to the transition mode, per block 168. If the controller 136 determines that the vehicle 10 is not ready for the transition mode, the controller 136 continues to adjust the swash plate position 166 as needed for the system 30. However, if the controller 136 determines that the vehicle 10 is in the transition mode, the controller 136 instructs the hydraulics circuitry 148 to cause the hydrostatic output clutch 50 to be disengaged and the engine clutch 44 to be engaged, per block 170.

During operation with this configuration (the transition mode), the engine 32 rotates and causes the engine shaft output gear 72 to drive the hydrostatic input shaft gear 74 to rotate. This causes the hydrostatic drive unit 34 to be powered and to drive the primary hydrostatic drive shaft 82. The rotation of the primary hydrostatic drive shaft 82 causes the secondary hydrostatic drive shaft 88 to rotate due to the coupling of the gears 84 and 86. The secondary hydrostatic drive shaft 88 rotation causes the ring gear 94 of the planetary gear unit 36 to rotate via gears 90 and 92. Further, with the engine clutch 44 engaged, the engine 32 drives the input sun gear 102 of the planetary gear unit 36. Thus, the planetary gear unit 36 functions in the combined differential mode and uses a summation of the driving forces supplied to the ring gear 94 and the input sun gear 102. The driving forces applied by to the ring gear 94 and the input sun gear 102 to the planetary gear unit 36 are combined and output by the planet carrier 110 to continue to drive the high torque clutch 58 using gear 114. Further, the combined force from the planetary gear unit 36 caused the output sun gear 112 to rotate, thereby driving gears 108 and 118 to rotate the input to the low torque clutch 54. As may be appreciated, in the transition mode, there is no gear reduction applied between gears 106 and 108 due to the hydrostatic output clutch 50 being disengaged. Therefore, the torque applied to the high torque clutch 58 may decrease from the torque applied in the hydrostatic mode.

At block 172, the controller 136 causes the swash plate of the hydraulic pump 146 to be adjusted. By adjusting the position of the swash plate, the rotational speed of the high torque clutch 58 can be synchronized with the rotational speed of the low torque clutch 54. After the clutches 54 and 58 are synchronized, the hydro-mechanical CVT system 30 may transition to the hydro-mechanical mode. As may be appreciated, the system 30 may change from the transition mode to the hydrostatic mode if the vehicle speed drops below a certain threshold. Further, if the vehicle speed remains within a certain threshold range, the system 30 may stay within the transition mode for a period of time. As the vehicle 10 swash plate is being adjusted, the controller 136 determines whether the clutches 54 and 58 are synchronized, per block 174. If the controller 136 determines that the clutches 54 and 58 are not synchronized, the controller 136 continues to adjust the swash plate position 172 as needed to synchronize the clutches 54 and 58. However, if the controller 136 determines that the clutches 54 and 58 are synchronized, the controller 136 instructs the hydraulics circuitry 148 to cause the low torque clutch 54 to be engaged and the high torque clutch 58 to be disengaged, per block 176.

During operation with this configuration (the hydro-mechanical mode), the engine 32 rotates and causes the engine shaft output gear 72 to drive the hydrostatic input shaft gear 74 to rotate. This causes the hydrostatic drive unit 34 to be powered and to drive the primary hydrostatic drive shaft 82. The rotation of the primary hydrostatic drive shaft 82 causes the secondary hydrostatic drive shaft 88 to rotate due to the coupling of the gears 84 and 86. The secondary hydrostatic drive shaft 88 rotation causes the ring gear 94 of the planetary gear unit 36 to rotate via gears 90 and 92. Further, with the engine clutch 44 engaged, the engine 32 drives the input sun gear 102 of the planetary gear unit 36. Thus, the planetary gear unit 36 functions in the combined differential mode and uses a summation of the driving forces supplied to the ring gear 94 and the input sun gear 102. The driving forces applied by to the ring gear 94 and the input sun gear 102 to the planetary gear unit 36 are combined and output by the output sun gear 112. Thereby, gears 108 and 118 are driven to rotate the input to the low torque clutch 54. The low torque clutch 54 is clutched to the transmission shaft output 116 to drive the shaft 116 with a lower torque than applied when the system 30 is in the hydrostatic mode. As may be appreciated, in the hydro-mechanical mode, there is no gear reduction applied between gears 106 and 108 due to the hydrostatic output clutch 50 being disengaged and between gears 100 and 114 due to the high torque clutch 58 being disengaged. Therefore, the torque applied to the low torque clutch 54 may be lower than the torque applied by the high torque clutch 58 in the transition and hydrostatic modes.

At block 178, the controller 136 causes the swash plate of the hydraulic pump 146 to be adjusted. This may be due to a request for a speed change by the vehicle operator. For example, the vehicle operator may increase the vehicle 10 throttle, which may cause the swash plate to move to a new position to cause the vehicle 10 to change its speed. As may be appreciated, the controller 136 keeps the vehicle 10 in the hydro-mechanical mode as long as the vehicle 10 is operating at high speeds (e.g., greater than approximately 3 kph). As the vehicle 10 approaches the lower threshold of the high speeds, the controller 136 determines whether to change the hydro-mechanical CVT system 30 to the transition mode, and to the hydrostatic mode.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A transmission for a vehicle comprising:
   an engine drive shaft configured to be driven by an engine;
   a planetary gear unit configured to be driven by power from the engine and to provide power to drive a transmission output shaft;
   a hydrostatic drive unit configured to be driven by power from the engine and to drive a primary hydrostatic drive shaft;
   an engine clutch configured to be driven by the engine to drive an input sun gear of the planetary gear unit while engaged;
   a secondary hydrostatic drive shaft configured to be driven by the primary hydrostatic drive shaft and to drive a ring gear of the planetary gear unit;
   a hydrostatic output clutch configured to be driven by the secondary hydrostatic drive shaft and to provide power to drive an output sun gear of the planetary gear unit while engaged;
   a high torque clutch configured to be driven by a planet carrier of the planetary gear unit and to drive the transmission output shaft;
   a low torque clutch configured to be driven by the output sun gear of the planetary gear unit and to drive the transmission output shaft; and
   a controller configured to cause the hydrostatic output clutch and the high torque clutch to be engaged and to cause the engine clutch and the low torque clutch to be disengaged to cause the planetary gear unit to operate in a hydrostatic differential mode while the vehicle is not moving, or while the vehicle is moving at low speeds.

2. The transmission of claim 1, wherein low speeds comprise speeds less than 3 kph.

3. The transmission of claim 1, wherein the controller is configured to cause the engine clutch to be engaged and to cause the hydrostatic output clutch to be disengaged while the vehicle is moving within a transition speed range to cause the planetary gear unit to operate in a combined differential mode, wherein the transition speed range comprises 2 to 4 kph.

4. The transmission of claim 3, wherein the controller is configured to determine when the rotations of the high torque clutch and the low torque clutch are synchronized.

5. The transmission of claim 4, wherein the controller is configured to cause a swash plate position of the hydrostatic drive unit to be adjusted to synchronize the rotation of the high torque clutch and the low torque clutch.

6. The transmission of claim 4, wherein the controller is configured to cause the low torque clutch to be engaged and to cause the high torque clutch to be disengaged after the rotations of the high torque clutch and the low torque clutch are synchronized for operating the vehicle at high speeds, wherein high speeds comprise speeds greater than 3 kph.

* * * * *